US011047092B2

(12) United States Patent
Ranocchia et al.

(10) Patent No.: US 11,047,092 B2
(45) Date of Patent: Jun. 29, 2021

(54) METHODS OF MAKING PAPER AND PAPER WITH MODIFIED CELLULOSE PULPS

(71) Applicant: Suzano S.A., São Paulo (BR)

(72) Inventors: Romolo Ranocchia, Sao Paulo (BR); Ademilson Massoquete, Aracruz (BR); Danilo Oyakawa, Sao Paulo (BR)

(73) Assignee: Suzano S.A., São Paulo (BR)

( * ) Notice: Subject to any disclaimer, the term of this patent is extended or adjusted under 35 U.S.C. 154(b) by 0 days.

(21) Appl. No.: 16/781,201

(22) Filed: Feb. 4, 2020

(65) Prior Publication Data

US 2020/0173112 A1 Jun. 4, 2020

Related U.S. Application Data

(62) Division of application No. 15/814,556, filed on Nov. 16, 2017, now Pat. No. 10,590,608, which is a division of application No. 14/797,428, filed on Jul. 13, 2015, now Pat. No. 9,828,728, which is a division of application No. 13/636,075, filed as application No. PCT/BR2011/000071 on Mar. 21, 2011, now Pat. No. 9,096,974.

(30) Foreign Application Priority Data

Mar. 19, 2010 (WO) ................ PCT/BR2010/000081

(51) Int. Cl.

| | | |
|---|---|---|
| *D21H 23/04* | (2006.01) | |
| *D21H 11/20* | (2006.01) | |
| *D21C 3/22* | (2006.01) | |
| *D21C 5/02* | (2006.01) | |
| *D21C 9/00* | (2006.01) | |
| *D21C 9/10* | (2006.01) | |
| *D21H 17/21* | (2006.01) | |
| *D21H 17/24* | (2006.01) | |
| *D21H 17/28* | (2006.01) | |

(52) U.S. Cl.
CPC ............ *D21H 23/04* (2013.01); *D21C 3/222* (2013.01); *D21C 5/025* (2013.01); *D21C 9/005* (2013.01); *D21C 9/1036* (2013.01); *D21H 11/20* (2013.01); *D21H 17/21* (2013.01); *D21H 17/24* (2013.01); *D21H 17/28* (2013.01); *Y02W 30/64* (2015.05)

(58) Field of Classification Search
USPC .................................................. 162/72, 141
See application file for complete search history.

(56) References Cited

U.S. PATENT DOCUMENTS

| | | | |
|---|---|---|---|
| 4,756,801 | A | 7/1988 | Joinen et al. |
| 4,927,498 | A | 5/1990 | Rushmere |
| 6,627,750 | B2 | 9/2003 | Wang |
| 7,303,654 | B2 | 12/2007 | Tokarz et al. |
| 8,986,500 | B2 | 3/2015 | Samuelsson et al. |
| 8,986,501 | B2 | 3/2015 | Li et al. |
| 2003/0127209 | A1 | 7/2003 | Sandberg et al. |
| 2004/0144510 | A1 | 7/2004 | Mauler |

FOREIGN PATENT DOCUMENTS

| | | |
|---|---|---|
| BR | 9803764 A | 5/2002 |
| EP | 0 148 647 A1 | 7/1985 |
| EP | 0 378 605 A1 | 7/1990 |
| EP | 0 899 373 A1 | 3/1999 |
| EP | 1 080 271 B1 | 3/2001 |
| WO | WO 89/06638 A2 | 7/1989 |
| WO | WO 99/55964 | 11/1999 |
| WO | WO 1999/057370 A1 | 11/1999 |
| WO | WO 00/28141 A1 | 5/2000 |
| WO | WO 2003/080924 A1 | 10/2003 |
| WO | WO 2004/046464 A1 | 6/2004 |
| WO | WO 2006/049542 A1 | 5/2006 |
| WO | WO 2007/078247 A1 | 7/2007 |
| WO | WO 2008/055327 A1 | 5/2008 |
| WO | WO 2011/113126 A2 | 9/2011 |

OTHER PUBLICATIONS

U.S. Appl. No. 15/814,556, filed Nov. 16, 2017, U.S. Pat. No. 10,590,608, Issued.
U.S. Appl. No. 14/797,428, filed Jul. 13, 2015, U.S. Pat. No. 9,828,728, Issued.
U.S. Appl. No. 13/636,075, filed Aug. 2, 2013, U.S. Pat. No. 9,096,974, Issued.
Brännvall, E. et al., "Fibre Surface Modifications of Market Pulp by Consecutive Treatments with Cationic and Anionic Starch," Nord. Pulp Paper Res. J., 22:244-248, (2007).
Dence, C. W. et al., Pulp Bleaching—Principles and Practice, TAPPI Press, 27-31, (1996).
Haack, V. et al., "Starch Derivatives of High Degree of Functionalization, 8a Synthesis and Flocculation Behavior of Cationic Starch Polyelectrolytes," Macromol. Mater. Eng., 287:495-502, (2002).
International Preliminary Report on Patentability for Application No. PCT/BR2010/000081 dated Sep. 25, 2012.

(Continued)

*Primary Examiner* — Mark Halpern
(74) *Attorney, Agent, or Firm* — Alston & Bird LLP

(57) ABSTRACT

The present invention relates to an improved process for producing chemical cellulose pulp wherein biopolymers are added immediately before, during or after a bleaching step, depending on pulp characteristics and on process conditions used. The biopolymers according to the present invention are starches chemically modified by an etherification reaction. This treatment results in a differentiated pulp having improved physical, chemical and mechanical properties when compared with cellulose pulps obtained by traditional processes. The use of said biopolymer alters the relations between important pulp properties rendering their application in papermaking process advantageous. This differentiation increases the possibilities of use and also of new applications, including for the substitution of pulps produced from other cellulose sources. Thus, the present invention also relates to methods of making paper, such as printing, writing, decorative, special or tissue-type papers, through the use of the cellulose pulps modified by the above process.

7 Claims, 9 Drawing Sheets

(56) References Cited

OTHER PUBLICATIONS

International Preliminary Report on Patentability for International Application No. PCT/BR2011/000071, dated Sep. 17, 2012.
International Search Report and Written Opinion for Application No. PCT/BR2010/000081 dated Mar. 1, 2011.
International Search Report and Written Opinion for International Application No. PCT/BR2011/000071, dated Sep. 14, 2011.
Mao, L. et al., Research Progress on Pulp Fiber Cationization, China Pulp and Paper, 26(7):45-48, (2007).
Neimo, L. (ed.), Papermaking Science and Technology, Papermaking Chemistry, Book 4, Fapet Oy, 269-287, (1999).
Notice of Opposition for European Application No. EP2547823 dated Apr. 12, 2017, 23 pages total.
Office Action for European Application No. 11 713 464 dated May 18, 2015.
Office Action for European Application No. 11 713 464 dated Sep. 22, 2014.
Whistler, R. L. et al., Starch Chemistry and Technology, Second Edition, Academic Press, 354-361, (1984).
Zhang, M. et al., "Can Recycled Kraft Fibres Benefit From Chemical Addition Before They Are First Dried?," Appita J., 55(2):135-144, (2002).

|               |        | GMT  | thickness |     |      |       |
|---------------|--------|------|-----------|-----|------|-------|
| reference     |        | 222  | 0,1420    | -4% |      |       |
|               | +15%   |      |           |     | -7%  |       |
| 0,5% BP       | +64%   | 255  | 0,1359    |     |      | -15%  |
|               | +124%  |      |           |     |      |       |
| 1,0% BP       |        | 363  | 0,1327    |     |      |       |
| 1,0% BP+starch|        | 581  | 0,1206    |     |      |       |

METHODS OF MAKING PAPER AND PAPER WITH MODIFIED CELLULOSE PULPS

CROSS REFERENCE TO RELATED APPLICATIONS

This application is a divisional of application Ser. No. 15/814,556, filed Nov. 16, 2017, which is a divisional of application Ser. No. 14/797,428, filed Jul. 13, 2015, now U.S. Pat. No. 9,828,728, which is a divisional of application Ser. No. 13/636,075, filed Aug. 2, 2013, now U.S. Pat. No. 9,096,974, which is a national phase of Application No. PCT/BR2011/000071, filed Mar. 21, 2011, which claims priority to International Application No. PCT/BR2010/000081, filed Mar. 19, 2010, each of which is hereby incorporated by reference herein in its entirety.

FIELD OF THE INVENTION

The present invention relates to a process for the production of cellulose pulps for enhancing said bleached pulps quality and applicability, especially their mechanical strength and drainability properties, by incorporating biopolymers specifically developed as additive into producing process recipe of said differentiated cellulose pulp.

BACKGROUND OF THE INVENTION

In addition to forest developments and treatments directed to paper manufacturing process for developing mechanical strength and other equally important properties, in the last few years, researchers of the sector have been working on additives association as the most promising means to enhance these properties in cellulose manufacturing process itself. Among the additives that have been used for manufacturing paper are the longer fibers, glues, dry and wet strength agents, starch, and others.

Document WO 00/28141 describes a method for treating lignocellulosic fibrous materials for enhancing the mechanical strength and humidity properties of the final product, which comprises fibrous materials, in which paper is the major example. The treatment involves the application of lignin derivatives in a solvent system with secondary additives which consist of a broad scope of sugars and natural polymers. This document describes the addition of additives in the paper machine approach flow, in the so-called wet end of the paper machine, where most additives are included in papermaking. Some additives mentioned in that patent application are widely known by the properties they provide when used in the recipe for producing some types (grades) of papers. In addition, the process described in that document requires the combination of the use of lignin for obtaining the desired results, which actually corresponds to the innovative aspect of that invention, and other secondary natural polymers are included as optional for boosting the development of the desired properties.

Another document describing the use of (the) biopolymer starch in a process for producing cellulose is PI9803764, which relates to a method for bleaching cellulose pulp with whitening chemical substances with the addition of starch, polyvinyl alcohols or enzymes. This document specifies the treatment for pulps having more than 5% lignin, emphasizing higher yield pulps such as mechanical pulps, thermomechanical pulps and chemothermomechanical pulps; thus, pulps without an ostensive bleaching process such as that of chemical pulps. The object of that invention is only to increase the whiteness of the pulp, and the secondary additives, such as enzymes and starch, are only intended to increase the efficacy of the optical whitening agents thus enhancing their absorption on the surface of the treated pulp fibers. These products for enhancing pulp whiteness are added in the last step before drying the pulp and do not develop the mechanical properties of the pulp.

Document U.S. Pat. No. 49,267,498 refers to a papermaking process where the additives are claimed as a retention aid. Therefore, this document teaches a polymer that must be added to the final cellulose pulp very close to the papermachine to keep a big formed floc and improve drainage. Examples 2 and 3 of this document mention a compozil additive, that is, a combination of two products to improve flocculation alone.

Document U.S. Pat. No. 4,756,801 teaches the addition of cationic starch in particular to the papermaking process to obtain a bonding agent in order to use different kinds of pulps and fillers in the paper production. The examples contained in this document again mentions additives as retention aids, which is its well known application for polymers in papermaking processes.

Document EP1080271 exclusively refers to a papermaking process and to the use of polysaccharides as a retention aid, where a secondary effect could be the strength. Besides, these polysaccharides must to have an aromatic hydrophobic group. This patent is also related to a minimum conductivity suspension. It is also the case of document EP0148647, which discloses a papermaking process. In the example 1, the application of polymer was carried out for softwood (long fibers) and starch was added just before the paper sheet formation. The result obtained in accordance to that example was retention of the pulp suspension during the paper sheet formation. Example 2 in turn mentions the combination of products in order to improve retention also using softwood as fiber furnish. Thus, this document refers to a polymer is used as additive to attach fines and fillers to form flocs and improve retention.

Document WO2004/046464 mentions the treatment of cellulosic material with clay and the secondary use of starch or other products as a retention aid. The main objective of this document is to produce cellulose with filler, were the secondary additives are only to become it possible.

In view of the above, it can be seen that it is already known for prior art to use polymers such as starch but as retention aids in the production of paper.

Accordingly, the object of the present invention is the use of a biopolymer during the process for producing cellulose pulp that is capable to promoting changes in the mechanical properties of the pulp as well as in other important properties, such as drainage, drying, porosity and pulp refining.

SUMMARY OF THE INVENTION

In a first embodiment, the present invention relates to a process for producing acid or alkaline cellulose pulps comprising a step of adding at least one biopolymer during the preparation process of said pulps, wherein the biopolymer is a starch modified by an etherification reaction.

In a second embodiment, the present invention relates to a cellulose pulp obtained by a process of treatment with at least one biopolymer, which is a starch modified by an etherification reaction.

In a third embodiment, the present invention further relates to the use of a biopolymer starch modified by a chemical reaction of etherification that enables the link between polymeric chains and some that underwent a reduction in the polymeric chain by hydrolysis reaction for the treatment of acid or alkaline cellulose pulps.

Further, the present invention relates to a process for the preparation of paper, such as printing, writing, decorative, special or tissue-type papers, through the use of the cellulose pulps modified by the above process.

DETAILED DESCRIPTION OF THE INVENTION

Figure 1:
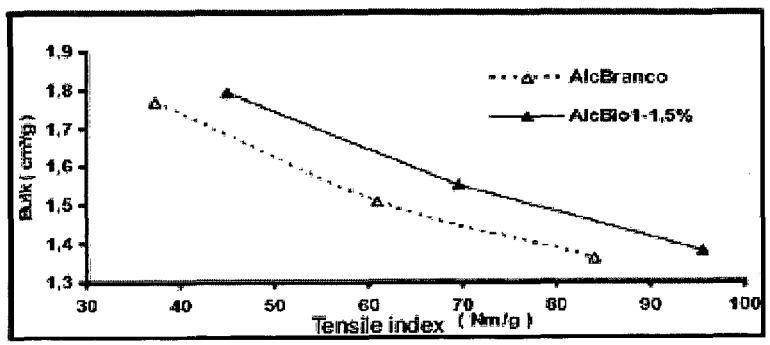
FIG. 1 shows a graph with data about the effect of adding a biopolymer according to the present invention to an alkaline pulp in the relation between tensile index and bulk considering refining effect in a PFI mill.

The biopolymer developed for the present invention is a polymer of natural origin which is submitted to a chemical reaction of etherification. More specifically, it is a modified starch in such a way that the hydrogen atom of molecule reactive group is substituted with another radical: 2,3-epoxypropyl-N-alkyl-N,N dimethylammonium chloride. The biopolymer can be produced from corn starch, manioc starch or any other plant source of starch.

Preferably, the etherification reaction for modifying the natural starch is carried out in an alkaline medium, in aqueous suspension with a solid content of 20% to 65% and under a controlled temperature conditions between 20° to 50° C. during a period of about 8 to 16 hours. In this reaction medium and using an alkaline catalyst to promote oxydryl groups activation, the process renders the starch molecule susceptible to the substitution reaction with an epoxide reactive agent (2,3-epoxypropyl-N-alkyl-N,Ndimethylammonium chloride) from (3-chloro-2-hydroxypropyl-trimethylammonium)amide with the stoichiometric addition of an alkali.

The abovementioned chemical modification was verified in biopolymers with different charges, comprising positive, negative, neutral or mixed charges wherein a same biopolymer chain has at least two types of different charges and can be characterized by the Degree of Substitution (DS). This value is determined by the average number, expressed in molar basis, of hydroxyl groups substituents of each D-glucopyranosyl unit that is part of the biopolymer. Several biopolymers were assessed with the DS of the set varying within a range of 0.020 to 0.065.

This modification process confers special characteristics to the biopolymers which favor their interaction with the fibers and other cellulose pulp components, such as vessels and fines elements. As a resulting benefit from this higher interaction there is an increase in bonds amount between the biopolymers and the several fractions of cellulose pulps. As a consequence of this procedure, it is possible to obtain an increase in cellulose physical resistance and draining proprieties.

Biopolymers act on cellulose with the formation of hydrogen bonds by multiplying the bonds among the fibers and helping to retain fines, which improves the mechanical strength and drainage of the paper produced in the future. Hydrogen bonds are ionic and considered to be weak; yet, they represent a significant contribution to cellulose and paper properties. Among them, the biopolymer molecules can form bonds with the creation of crystalline regions having high binding capacity between fibers and fines, uniformly forming high resistance clusters distributed in cellulose and in paper. The intensity of this phenomenon may vary with specific biopolymers constitution, size distribution and molecule dispersion, in addition to chemical modifications promoted by other reactions.

Other interactions can be present in the contacts between the biopolymers of the present invention and cellulose and paper components such as electrostatic attraction and Van der Waals forces. This diversity of biopolymer interactions ensures its permanent effects on paper final characteristics even after going through cellulose and paper manufacturing process.

The modified biopolymers used in the present invention are selected according to each type of cellulose pulp to be treated and, therefore, according to each type of specific production process, depending on reaction conditions and on the degrees of substitution required for the desired results.

The inventors have noticed that the addition of these biopolymers specifically developed for the process of the present invention can differentiate pulps properties, particularly cellulose pulps of eucalyptus, with a substantial increase in tensile strength, tear resistance, drainability, and air permeability, among other important and desired properties. This enables differentiated and innovative applications, and the possibility of using more short fibers instead of the long fibers, and can result in improvements in plant productivity or energy savings because it facilitates pulp dewatering in the drying stage.

As the properties of cellulose treated according to the process of the present invention are in-between the short- and long-fiber celluloses, with some important relations among those properties being better than those of the original eucalyptus fiber cellulose, the differentiated cellulose thus obtained can also be considered a new long-fiber substitution product. Due to the differences obtained for the biopolymer used in the present invention, they can be employed in pulps applied in the manufacture of different types of papers, such as printing, writing, decorative, special or tissue-type papers, for instance.

It must be, therefore, highlighted that the process of the present invention does not refer to the use of a biopolymer in a later stage during the papermaking process. Rather, it refers to the use of said biopolymer during the process of production to obtain modified cellulose with improved mechanical and drying properties as consequence of this modification on the cellulose process. The cellulose thus produced is then dried, repulped, and afterwards goes through the complete process of papermaking. The process of the present invention aims to have the polymer intimately bonded to the cellulose fibers in order to increase the number and strength of fiber to fiber bondings. The final objective is to increase the mechanical strength of the cellulose. Therefore, the invention rely on the verification that the mechanism involved in the process as claimed in the present application is to form bonds between fibers and biopolymer that will remain through the drying and papermaking process.

Therefore, the modified biopolymers are added to the cellulose pulp before said pulp is sent to the paper making process, passing through a drying and packing process of the obtained cellulose. These biopolymers adsorbed in the cellulose fibers can go through a disintegration and refining process, when cellulose later enters the paper manufacturing process. They still retain the special characteristics obtained in the modification of the process of cellulose manufacturing enabling savings some additives that are typical of certain kinds of papers, which could be reduced or eliminated.

In other words, the improved properties (e.g. tensile resistance, tear resistance, drainage resistance and air permeability) of the pulp obtained by the treatment process with the biopolymer are important since they facilitate the paper making process.

These improved properties will be promptly transferred to the paper obtained, especially the tissue-type paper and printing paper. Therefore, the mechanical deficiency caused by the increased content of short fibers in the paper making process is overcome and important properties, such as absorption and softness, are obtained in view of the high amount of short fiber.

According to pulp manufacturing process and to the present invention, the addition of the biopolymer can be made in several ways and in at different times in view of the process variables which, in turn, vary in view of pulp desired characteristics. Some of these conditions can be obtained in delignification stage with oxygen, between the bleaching stages or even right after the pulp is bleached.

The process according to the present invention can also be applied to high yield pulps, which are pulps that do not go through a more drastic cooking and bleaching process, such as the chemical pulps, and keep their yield above 65%, provided they meet the biopolymer application conditions. Among the most well-known high yield pulps, mechanical, thermomechanical and chemothermomechanical pulps can be mentioned.

After going through the bleaching process, an additional treatment can be applied to the cellulose pulp under the required conditions for the biopolymer to modify said pulp. The biopolymer added in this stage, that is, after bleaching, should be activated by a cooking process, under conditions to be determined according to the specific characteristics of the biopolymer used. In the case of biopolymers that accept alkaline conditions, for example, they can be added in suitable temperature, pH and residence time conditions, in several points of the process, such as: oxygen delignification and alkaline stages of bleaching. In both cases, the biopolymers are fixed to the pulp before it is sent to the paper production process, going through the obtained cellulose drying, baling and rebeating processes without losing the characteristics added.

According to a preferred embodiment of the invention, the process for treating the cellulose pulp comprises a process of bleaching alkaline pulp having the sequence ADo(Eop)PP wherein the acronyms of the bleaching stages mean: A, the acid stage; Do, the short stage of chlorine dioxide; Eop, the alkaline extraction stage with small oxygen and hydrogen peroxide doses and P, the hydrogen peroxide dosage stages and wherein the biopolymer is added between one of the alkaline steps of bleaching or in an alkaline step before bleaching.

Still in a preferred embodiment, the biopolymer is added to the cellulose pulp during the treatment process in an amount of 5.0 kg/adt to 20.0 kg/adt based on pulp total amount, in a temperature range of from 45° C. to 95° C., preferably from 70 to 90° C., and with a contact time between the biopolymer and the pulp in the range of 10 min to 360 minutes, preferably from 30 to 90 minutes. Preferably, the pH during the addition of the biopolymer is from 8 to 11 for alkaline pulps and from 3 to 6 for acid pulps.

Behavior assessments of regular variations in the cellulose manufacturing process relating to the properties of the cellulose modified with biopolymers according to the present invention should be made for each production process. In addition, an assessment of the interference of this new modified cellulose product in the properties and in the manufacturing process of different types of papers should be carefully developed for the application of cellulose modified with biopolymers, and such parameters may be promptly determined by skilled artisans and do not represent an essential and determinant characteristic of the present invention.

EXAMPLES

The following examples will better illustrate the present invention, and the particular conditions and parameters described represent preferred, and non-limiting, embodiments of the present invention.

Process for the Treatment of Cellulose Pulps

Example 1

For a alkaline pulp treating process, it was used a biopolymer herein identified as "AlcBio1", referring to a hybrid corn polysaccharide chemically modified by etherification in the following conditions: pH of 8.5 in aqueous suspension with 30% of solids concentration and a controlled temperature of 30° C., during a period of 8 hours. Its physical aspect corresponds to a fine white powder having a characteristic starch odor, insoluble in water and organic solvents. With regard to its chemical characterization, said biopolymer AlcBio1 has a degree of substitution of 0.025 to 0.045, hydrogenionic potential (pH) of 5.5 to 6.5 and maximum humidity of 14%.

Example 2

For alkaline pulp treating process, it was used a biopolymer herein identified as "AlcBio2", referring to a corn polysaccharide chemically modified by etherification in the following conditions: pH of 8.5 in aqueous suspension with 40% solids concentration and a controlled temperature of 40° C., during a period of 6 hours. Its physical aspect corresponds to a fine, white powder, insoluble in water and organic solvents. With regard to its chemical characterization, said biopolymer AlcBio2 has an amphoteric charge (positive and negative) with a degree of substitution of 0.025 to 0.042, hydrogenionic potential (pH) of 5.5 to 6.5 and maximum humidity of 14%.

Example 3

For alkaline pulp treating process, it was used a biopolymer herein identified as "AlcBio3", referring to a corn polysaccharide chemically modified by etherification in the following conditions: pH of 9.0, in aqueous suspension with 35% of solids concentration and a controlled temperature of 30° C., during a period of 8 hours. Its physical aspect corresponds to a fine white powder, insoluble in water and organic solvents. With regard to its chemical characterization, said biopolymer AlcBio3 has anionic charge, hydrogenionic potential (pH) of 5.5 to 6.5 and maximum humidity of 14%.

Example 4

For acid pulp treating process, because of process conditions requirements, the biopolymer herein identified as "AcBio2" was used, which is an aqueous solution formed by a starch polysaccharide chemically modified as previously described having the degree of substitution in the range of from 0.022 to 0.040, pH of 5.0 to 6.0, and containing preservative based on benzisothiazolinone. This preservative was needed to avoid degradation of the product, which is quite susceptible to attacks of microorganisms. Biopolymer AcBio2 has the following physical features: cream color viscous solution, characteristic odor of starch, maximum bulk density of 1.13 g/cm$^3$, solid contents of 24.0% to 27.5%, maximum viscosity of 2000 cP, and hydrogenionic potential (pH) of 5.5 to 7.5.

Comparative Test Results

With these examples of biopolymers AlcBio1 (alkaline process) and AcBio2 (acid process), laboratory tests, intermediate and industrial scale tests were carried out. The results obtained in these cases show important developments on modified cellulose properties. In laboratory scale, the equipment used was a cellulose bleaching reactor with a 300 g dry fibers capacity, and total automatic control of the process conditions. In the preindustrial scale test of the process, the reactor used, which had a 100 kg dry pulp capacity, also had automatic control of the process variables. However, in this case, the addition and shearing conditions were closer to the industrial conditions due to pumping operations and loss of load during cellulose transportation.

Optimized procedures with alkaline pH pulp were developed to use the biopolymer without interfering in the cellulose manufacturing process. To this end, the biopolymer was added between the two stages of hydrogen peroxide, within the sequence used for cellulose bleaching. In this stage, the bleaching conditions, which were compatible for the application of the biopolymer, were: pH—11.0, temperature—90° C., consistency—10% and retention time—80 minutes. For these conditions, biopolymer AlcBio1 was chosen. This biopolymer was dosed in several quantities relating to the percentage of dry fiber with a view to optimizing its dosage.

Biopolymer application to alkaline cellulose was done in-between the bleaching stages, because these technical conditions were the most advantageous for activating their desired contributions. However, other alkaline stages can also receive said biopolymers dosage with equally advantageous results with regard to the base pulp.

Other studies in larger scale were also carried out, including assessing the refining capacity of the resulting pulp so as to confirm the advantages obtained with the present procedure. As expected, the results were proportionally increased in relation to the dosed quantities. However, as the dosage effect is not linear, a cost/benefit analysis shows that the dosage can be optimized with the use of this process in industrial scale, but it is currently around 0.5 to 1.5%. Part of the results shown later in this document relate to 1.5% dosages of the biopolymer AlcBio1 in these conditions.

Cellulose modification development with biopolymers was complemented in a second step with the modification of the acid pulp, as indicated in example 2. The purpose of this study was to improve the development of a biopolymer suitable for the many acid pH conditions noticed in cellulose producing process. This dosage required other biopolymers types, since the process conditions are different and incompatible with the biopolymers used in the previous process, which is alkaline. The biopolymers that will be added to cellulose in acid pH should be activated out of the cellulose production process, before their addition. In this case, the biopolymer AcBio2 was obtained and is suitable for cellulose producing process with application in the pulp in the end of the bleaching process. Said biopolymer AcBio2 was applied in the following conditions: pH—5.5; temperature—70° C.; consistency—10% and retention time—30 minutes. The biopolymer dosage is similar to the described in alkaline pulps, and the results are also as satisfactory as those achieved with these pulps. This condition can be facilitated if the last stage of bleaching is acid. In this case, an effective mixture with the pulp significantly contributes to the effect of the biopolymer before a probable dilution of cellulose in later operations process.

The studies carried out with the biopolymers of the present invention show that, although the results are not linear, the properties gain is directly proportional to the additive amount added, which advantageously can be from 5.0 kg/adt to 20.0 kg/adt. From the samples selected for the pilot test, one was applied in the alkaline condition and the other in the acid condition according to the possible success rates for working with these biopolymers within the cellulose manufacturing process.

The initial experimental work of the present invention included laboratory tests for sole application in pulps produced in alkaline pH because the process conditions for such cellulose seemed to be the most suitable for the required development. Actually, after multiple tests and modifications to the biopolymers, the results were positive in these conditions. After these first results, biopolymers development for use in pulps with acid pH was less expensive and the results obtained were equally positive.

After defining process conditions, the product dosages were also optimized. Although the amount added is also linked with development scale, as seen in the test carried out in the pilot plant. The tests made in the pilot plant, in the conditions used in the laboratory, but in reactor with a 100 kg dry pulp capacity, showed the same improvement tendency of interest properties. The biopolymer in this case should be diluted in potable water or in wash water of the bleaching stages with maximum distribution and mixing with the pulp that receives it.

Both cases tested enhanced the mechanical strength and drainage properties in spite of the different characteristics of the biopolymers applied. Despite the costs involved with the biopolymers added in this invention, compensation was detected in pulp refining for paper production when this operation is obviously required. Refining shows that for this differentiated pulp with a biopolymer the required energy to arrive the same drainability degree and mechanical strength is lower than that needed for the pulp with the same fiber without the presence of biopolymer, in all process conditions tested. Obviously, this advantage should vary according to the refining technology used and paper type where this cellulose is applied.

First of all, some important results are presented for alkaline pulps obtained in laboratory scale.

The results shown in FIG. 1 demonstrate the relation between the tensile index, as the first property to be developed as reference, that is, the purpose was to increase the mechanical strength of the pulp also providing a positive relation with other important properties. Biopolymer addition according to the invention shows that there is an increase in the tensile strength and bulk within the studied grinding curve; for the same bulk the increase in the tensile index is very significant, and vice-versa.

The amount of biopolymer AlcBio1 added in the experiment was 1.5% biopolymer over the dry mass of the substrate to be treated.

Figure 2:
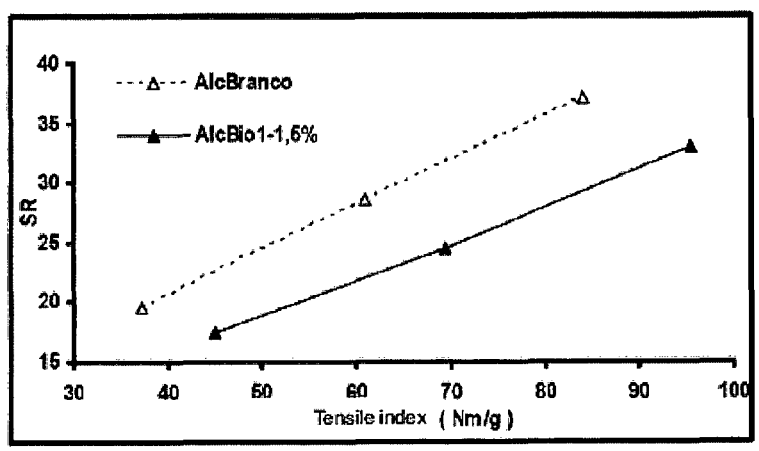
FIG. 2 shows a graph with data about the effect of adding a biopolymer according to the present invention to an alkaline pulp in the relation between the tensile index and the Schopper Riegler value ('SR) considering refining effect in a PFI mill.

The relation between the tensile index and the Schopper Riegler value ('SR) (a measurement of the rate at which a diluted pulp suspension may be de-watered) shown in FIG. 2 demonstrates that, with the use of biopolymer AlcBio1, a pulp with higher mechanical strength and lower energy cost was obtained for drying the same amount of pulp or an increasing the production of the plant with the same energy consumption.

Figure 3:
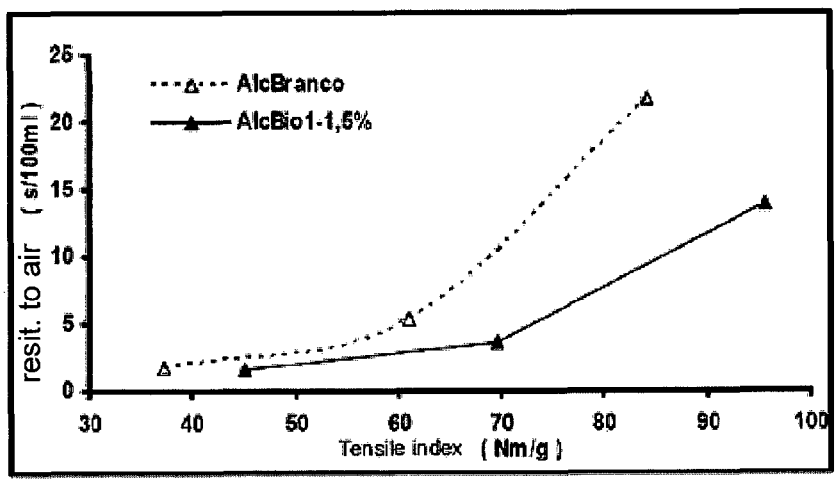
FIG. 3 shows a graph with data about the effect of adding a biopolymer according to the present invention to an alkaline pulp in the relation between the tensile index and the Gurley value, considering refining effect in a PFI mill.

Other parameter measured was the relation between the tensile index and the Gurley value (measure of how fast a defined volume of air can pass through a defined area of membrane at standard pressure), which characterizes the air permeability of the cellulose pulp sheet. The results are shown in FIG. 3. This property is especially interesting due to its development during the process of grinding in the PFI laboratory mill. The increase in air permeability can also imply an improvement in the drying process, especially in the paper machine where cellulose has gone through the refining process.

In the case of acid cellulose, similar analyzes were carried out using the knowledge acquired in the previous case. For this study, biopolymer AcBio 2 was used with the specification of the degree of substitution 0.022 to 0.040 and pH of 5.0 to 6.0. The biopolymer amount added in the experiment was 1.5% biopolymer over the dry mass of the substrate to be treated.

Figure 4:
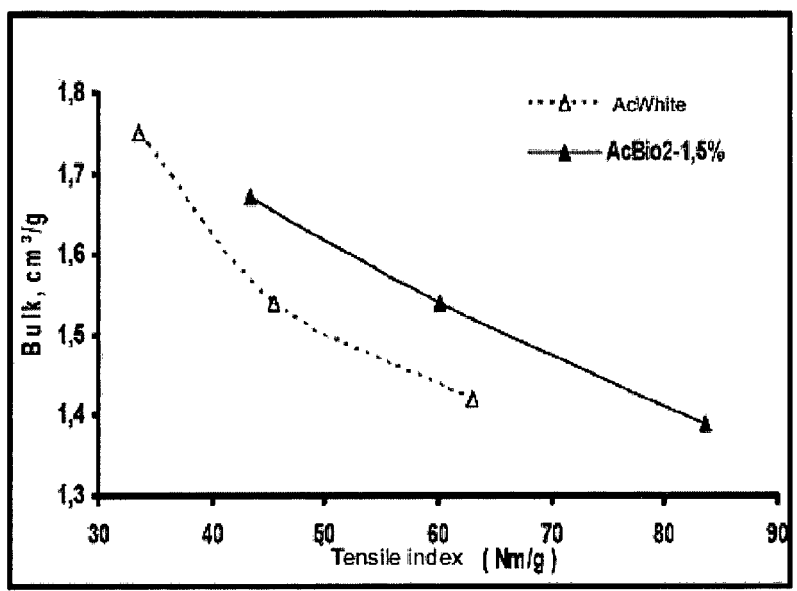
FIG. 4 shows a graph with data about the effect of adding a biopolymer according to the present invention to an acid pulp in the relation between the tensile index and bulk considering refining effect in a PFI mill.

As can be observed by the results, the gains in all properties were similar, considering the large difference between the biopolymers and the dosage points among the pulps being studied. The relation between the tensile index and bulk shows an increase in the tensile index and bulk in the entire grinding range studied in the laboratory experiments. In the case of acid pulps, it is evident that the tensile gain for the pulps with biopolymers is higher than that with the original pulps (white), for the same amount of energy applied (FIG. 4).

Figure 5:
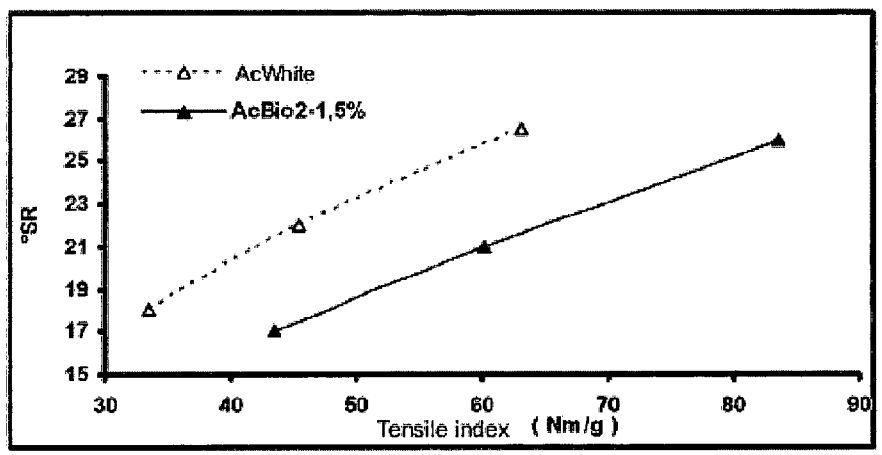
FIG. 5 shows a graph with data about the effect of adding a biopolymer according to the present invention to an acid pulp in the relation between the tensile index and the Schopper Riegler value considering refining effect in a PFI mill.

The relations between the tensile index and the Schopper Riegler value (° SR) for the acid pulps with and without biopolymer shown in FIG. 5 are higher than the results for the alkaline pulps. However, this benefit is very important in alkaline pulps because of their higher greater draining difficulty.

Figure 6:
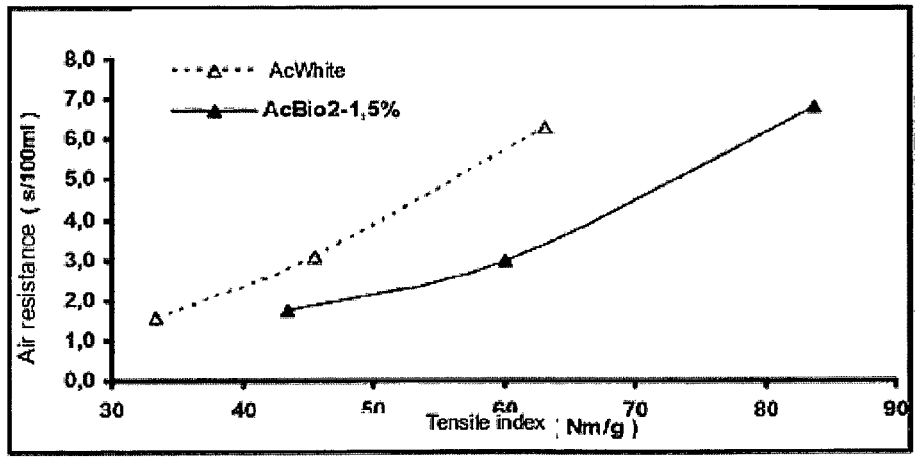
FIG. 6 shows a graph with data about the effect of adding a biopolymer according to the present invention to an acid pulp in the relation between the tensile index and the Gurley value considering refining effect in a PFI mill.

FIG. 6 shows a decrease in air resistance with the application of biopolymer for the acid pulp.

These were the properties with the highest interest among those investigated, which show the invention efficacy in developing important properties that are constantly requested by customers of short-fiber cellulose. Other properties such as tear and opacity also show advantages with the application of biopolymers according to the present invention.

To confirm the values obtained on laboratory scale, a pilot test was conducted in a plant with a 100 kg pulp capacity, considering air-dried fibers. The pilot plant, in which the cellulose treated with biopolymers produced according to the process of the invention, consists of a dilution tank, wherein the pulp was prepared under the required conditions and a mixer that receives the required reagents. In this case, the reagents and the process conditions were similar to those used in the laboratory. The reagent is only the biopolymer added to the pulp at 10% consistency and the process conditions were exactly the same with a residence time of 60 minutes, temperature of 60° C. and reactor rotation of about 28 rpm.

After going through the mixer, the pulp enters the reactor where the reaction conditions and the retention time were preserved. After the reactor, the pulp went through a discharge tank and a dewatering table that enabled the pulp to reach up to 35% dryness. Drying was concluded in a drying room under controlled temperature and humidity conditions so that the pulp properties were not affected by hornification other than by traditional cellulose drying.

The obtained pulps were refined in pilot plant refiners with 12-inch diameter disks. The disks employed enabled the use of a very low intensity refining technology, which is proper for eucalyptus cellulose. The results of such refining show substantial energy savings for pulps with biopolymers of the present invention compared with common eucalyptus pulps, using as basis the same mechanical strength expressed in the cellulose tensile index, as can be seen in the drawings.

The drawings refer to alkaline and acid pulps which are refined in the papermaking process, which in both cases represent energy gains for the paper manufacturer with biopolymer use. The drawings also clearly indicate that energy amounts applied during refining in pilot plants, which should be related with properties magnitude shown in the sequence.

Figure 7:
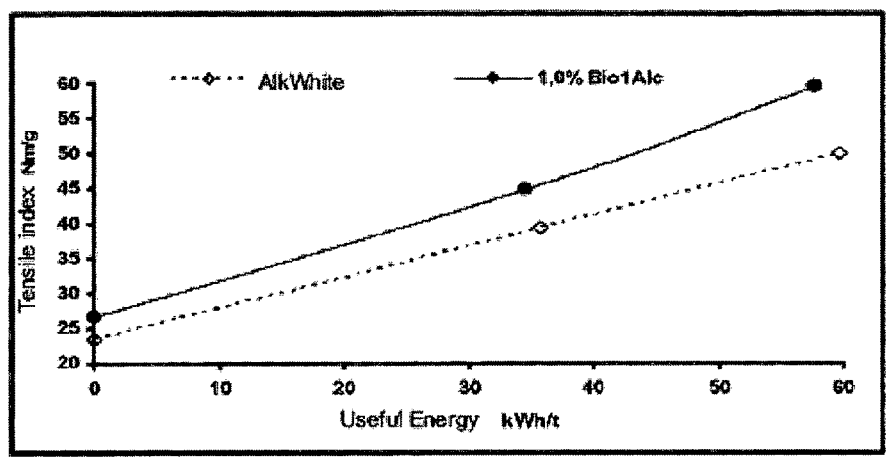
FIGS. 7 and 8 show a graph with data about the effect of adding a biopolymer according to the present invention to alkaline and acid pulps, respectively, in the relation between the tensile index and energy consumption considering refine effect in a pilot plant.

FIG. 7 compares a reference pulp with another pulp with the application of 1.0% biopolymer AlcBio1 and the same energy was used for both pulps. The comparison of theses pulps shows that energy can be saved to obtain the same mechanical strength through refining.

Figure 8:
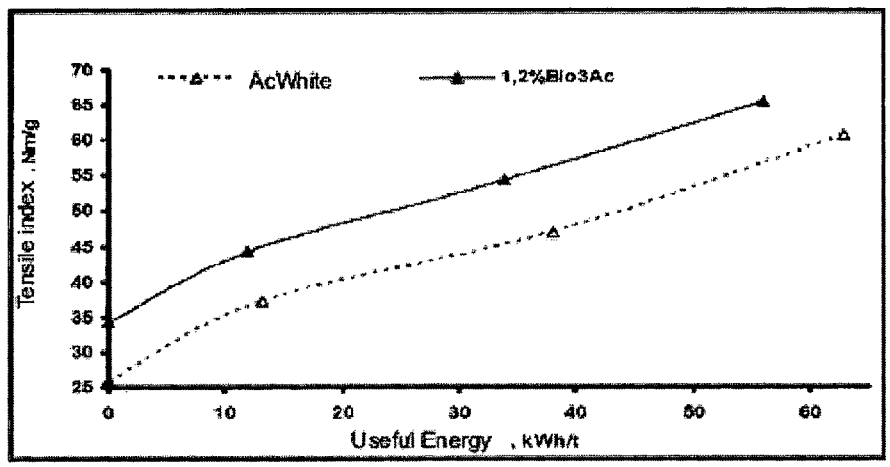

Under similar comparison conditions, FIG. 8 shows the refining results in a pilot plant for acid pulps. The properties analyzed in the sequence refer to the pulps obtained and refined in a pilot plant, therefore submitted to different treatments and stresses than the pulps obtained and treated in the laboratory scale. The results obtained also corroborate the results on laboratory scale showing the same gain tendency of the same properties analyzed. In this case, there is also an improvement in the mechanical strength and drainage properties, which are two characteristics that potentiate the application of this modified cellulose.

Figure 9:
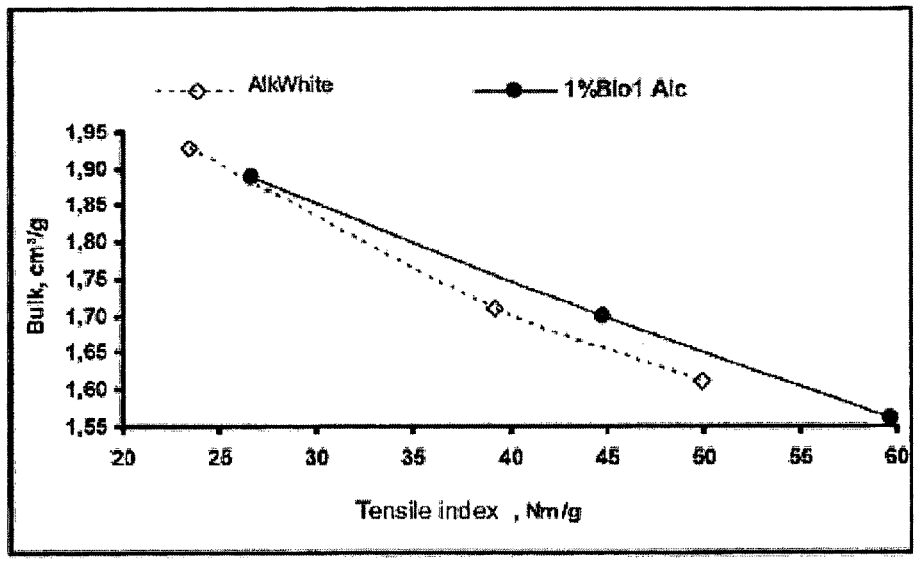
FIG. 9 shows a graph with data about the effect of adding a biopolymer according to the present invention to an alkaline pulp in the relation between the tensile index and bulk considering refine effect in a pilot plant.

FIG. 9 shows a small bulk gain with the addition of 1.0% biopolymer in alkaline pulp, the results in the industrial application should be similar to these results or even better due to better process conditions. The increasing bulk effect is always advantageous for cellulose.

Figure 10:
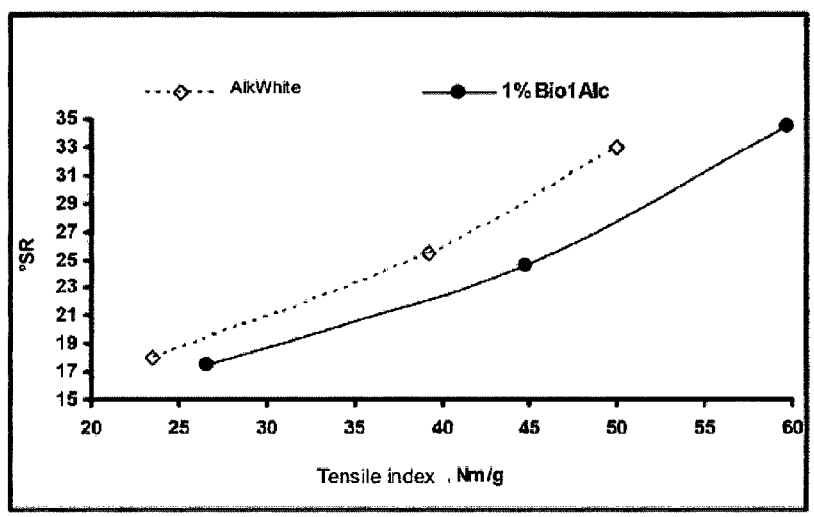
FIG. 10 shows a graph with data about the effect of adding a biopolymer according to the present invention to an alkaline pulp in the relation between the tensile index and the Schopper Riegler value considering refine effect in a pilot plant.

The drainability effect for the alkaline pulp shown in FIG. 10 also followed a positive tendency reiterating the results on laboratory scale.

Figure 11:
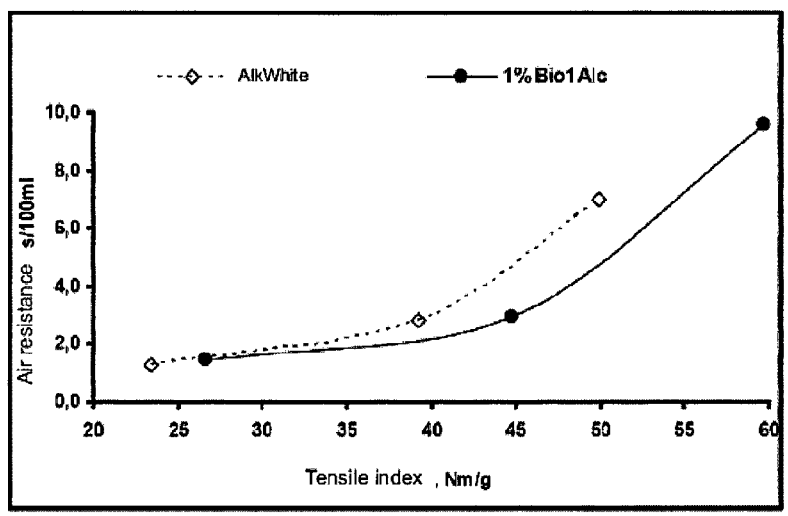
FIG. 11 shows a graph with data about the effect of adding a biopolymer according to the present invention to an alkaline pulp in the relation between the tensile index and the Gurley value considering refine effect in a pilot plant.

FIG. 11 shows the positive effect achieved with biopolymer application of the present invention in air permeability increase of cellulose, which grows as the refining effects intensify.

Figure 12:
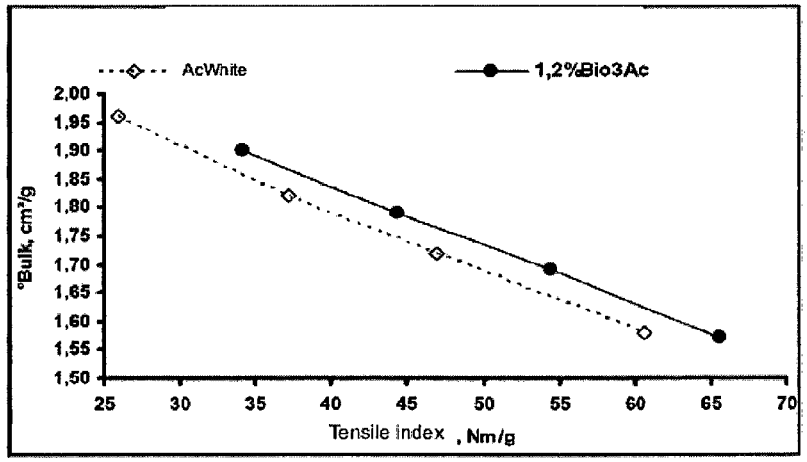
FIG. 12 shows a graph with data about the effect of adding a biopolymer according to the present invention to an acid pulp in the relation between the tensile index and bulk considering refine effect in a pilot plant.

In the case of acid pulp, the tendency is also to have a bulk increase with biopolymer presence throughout the refining curve in the pilot plant. This result is coherent with alkaline pulp effects, and the results on laboratory scale show that these gains can be better (FIG. 12).

Figure 13:
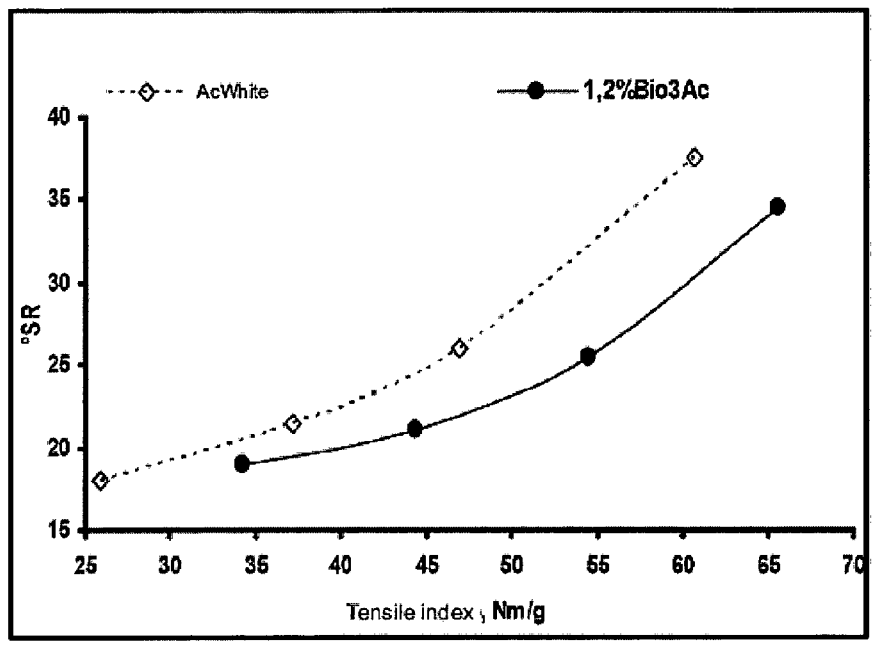
FIG. 13 shows a graph with data about the effect of adding a biopolymer according to the present invention to an acid pulp in the relation between the tensile index and the Schopper Riegler Value considering refine effect in a pilot plant.

FIG. 13 shows the gain in Schopper Riegler value during the development of refining in a pilot plant. This represents a property gain with lower energy consumption or even a possible increase in the productivity of the cellulose drying machine and the paper machine, with the same mechanical strength properties.

Figure 14:
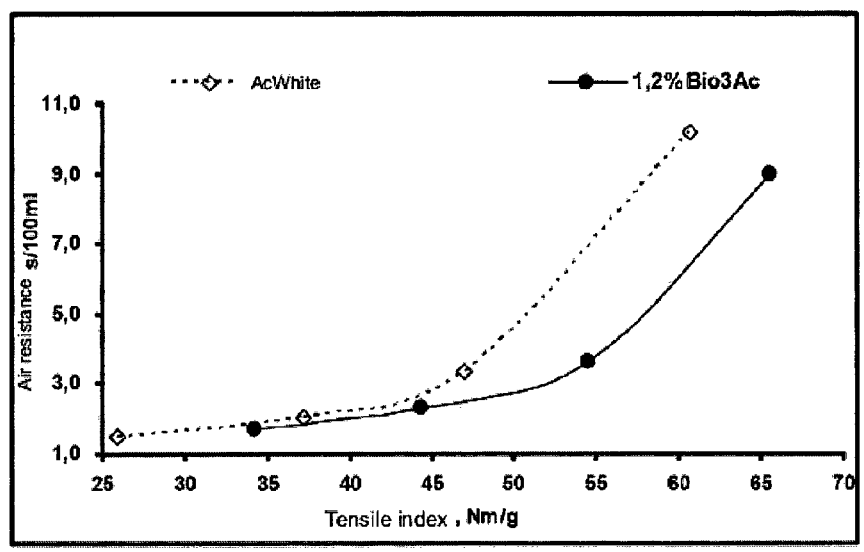
FIG. 14 shows a graph with data about the effect of adding a biopolymer according to the present invention to an acid pulp in the relation between the tensile index and the Gurley value considering refine effect in a pilot plant.

FIG. 14 shows the refining curves for the Gurley value, following the same tendency of the alkaline cellulose and of the laboratory scale tests, shows a decreasing in air permeability resistance, which is measured with the Gurley equipment, as a biopolymer contribution. This advantage increases with refining development.

All the presented results are evidences of cellulose modifications and, more than that, they show that the interrelationships among important properties are positively changed bringing greater benefits to cellulose application. These modifications result in the possibility of having intermediate applications in-between the properties of short- and long-fiber celluloses having a great substitution potential with percentage advantages of the long fibers in the paper recipes, especially in tissue paper and in printing and writing papers.

Process for Making Paper Using the Treated Cellulose Pulp

In order to demonstrate the superiority of the paper produced from cellulose pulp modified by the biopolymer according to treating process disclosed above, samples of tissue paper type paper, more specifically toilet paper, and printing and writing were prepared.

Nevertheless, before describing the details of the examples, it is necessary provide some important definitions in order to support the description of the present invention:

"Short-fiber pulp" means a pulp originated from woods such as Eucalyptus, but that can also include other species such as Acacia, Birch, Maple, among others, since the short-fibers characteristics that can affect the relevant paper properties in the present invention are similar to these woods.

"Bleached chemical pulp" means pulp obtained by the chemical process of cooking and bleaching. This pulp is specially used in the manufacture of tissue-type paper.

"Eucalyptus natural fiber" means natural fibers that were obtained by a chemical process of pulping and bleaching without additives unrelated to the process used.

"Modified Eucalyptus fiber" means Eucalyptus fiber modified by the modified biopolymer.

"Fibrous structure" means a structure formed by a fibrous web due to the intertwining of fibers by the previous preparation of fiber and subsequent deposition of an amount of fiber, usually on a screen or a felt, in order to form the structure. Typically in the manufacture of paper, whatever its type, this structure is formed on a screen, dried and rolled into a coil.

In the manufacture process of tissue-type paper, the structured leaves are produced with pressing regions with smaller areas of high density and other regions with larger areas of high bulk, softness and liquids absorption capacity. The traditional structures are flat wherein the leaf is only formed on a flat screen.

The structure of writing and printing paper was also formed in a flat structure in a traditional Fourdrinier machine.

Description of the Production of Tissue-Type Paper

The tissue-type papers produced with the modified cellulose were paper towel (with a paper density of 21 $g/m^2$) and toilet paper (with a paper density of 16 $g/m^2$) on machines with standard configuration. The formulation of these papers is typical for most producers of high quality papers, with 75% of short-fiber and 25% of long-fiber for the toilet paper, and with 70% of short-fiber and 30% of long-fiber for the paper towel. The long-fiber is normally refined to ensure the mechanical strength and to increase the short-fiber content, but the same degree of refinement was used for all paper manufactured. The additives selected for this paper production are also the typical used in producing these types of tissue papers, such as wet strength agent and dry strength agent.

The machine used for this paper manufacturing is in a pilot scale, with width of 1,000 mm and speed of 1,000 m/min, with Crescent Former and conventional press with suction against the Yankee cylinder, and a daily production of 3 tons of paper. The paper is dried on Yankee cylinder and rolled into coils. This machine allows samples to be crepes, with an angle variation of the creping, or rolled flat.

In the mass preparation, the samples of short-fiber and long-fiber were disintegrated in a pulper where they also receive the necessary chemical additives. For the toilet paper preparation, starch was added as dry strength agent, and for the paper towel preparation, the Kymene® product from Ahsland, cationic resin (to improve wet strength) and carboxymethylcellulose were added. The long-fiber was refined and mixed with short-fiber to enter the machine.

Table 1 shows the principal variations during the toilet paper manufacturing in said pilot machine.

For the toilet paper made from reference pulp, the paper grammage of 17 g/m² and tensile of 400 gf/50 mm in the machine direction (MD) and of 200 gf/50 mm in the cross direction (CD) were specified. For the towel paper, the paper grammage of 20 g/m² and tensile of 1200 gf/50 mm in the machine direction (MD) and of 800 gf/50 mm in the cross direction (CD) were specified.

The properties obtained with the web of structured fiber of the reference pulp and of structured fiber of modified pulp showed significant differences. The property with more improvement was the mechanical strength of the paper, which was measured as tensile that directly increases when the addition of biopolymers also rises.

Another test carried out during the production of toilet paper was the addition of starch in the machine approach flow, which is usually part of this process of production, where starch is used as dry strength aid. In this case, an impressive increase of tensile occurred with the cellulose modified with 1.0% of biopolymer plus the addition of 6.0 kg/ton, when comparing to the reference pulp. This property has increased (with cellulose modified) by about 150% in

TABLE 1 principal variations during the toilet paper manufacturing in said pilot machine

| Paper Type | SPR Vacuum Pressure (bar) | Uhlebox (bar) | Straight load (kN/m) | Yankee Speed (m/min) | Pressure (bar) | Hood °C. | Temperature Surface °C. | Scraper Paper °C. | Jumb roll °C. |
|---|---|---|---|---|---|---|---|---|---|
| Toilet 1 | 0.23 | 0.56 | 90 | 1000 | 6.5 | — | 90 | 83 | 47 |
|  | 0.23 | 0.58 | 90 | 1000 | 6.5 | 434 | 96 | 91 | 50 |
|  | 0.24 | 0.58 | 90 | 1000 | 6.5 | 438 | — | — | 52 |
|  | 0.24 | 0.58 | 90 | 1000 | 6.5 | 440 | 89 | 83 | 49 |
|  | 0.24 | 0.58 | 90 | 1000 | 6.5 | 440 | 89 | 83 | 49 |
|  | 0.24 | 0.58 | 90 | 1000 | 6.5 | 469 | — | — | — |
|  |  |  |  |  | Average | 444 |  |  |  |
| Toilet 2 | 0.24 | 0.58 | 90 | 1000 | 6.5 | — | — | — | — |
|  | 0.24 | 0.58 | 90 | 1000 | 6.5 | 477 | — | — | — |
|  | 0.24 | 0.58 | 90 | 1000 | 6.5 | 477 | — | — | — |
|  | 0.24 | 0.58 | 90 | 1000 | 6.5 | — | 93 | 102 | 57 |
|  | 0.25 | 0.58 | 90 | 1000 | 6.5 | 483 | 94 | 100 | 55 |
|  | 0.25 | 0.58 | 90 | 1000 | 6.5 | 482 | 96 | 87 | 54 |
|  | 0.25 | 0.58 | 90 | 1000 | 6.5 | 472 | 101 | 89 | 56 |
|  |  |  |  |  | Average | 478 |  |  |  |
| Toilet 3 | 0.24 | 0.58 | 90 | 1000 | 6.5 | — | 97 | 88 | 54 |
|  | 0.25 | 0.58 | 90 | 1000 | 6.5 | 462 | 93 | 84 | 54 |
|  | 0.25 | 0.58 | 90 | 1000 | 6.5 | 459 | 91 | 82 | 54 |
|  | 0.25 | 0.58 | 90 | 1000 | 6.5 | 458 | 86 | 81 | 52 |
|  | 0.25 | 0.58 | 90 | 1000 | 6.5 | 456 | 88 | 80 | 50 |
|  |  |  |  |  | Average | 459 |  |  |  |

The samples tested were papers produced with cellulose modified by a biopolymer (modified pulp) and with regular eucalyptus cellulose pulp (reference pulp), which will form the basis for a comparative analysis. The difference between the paper towel and toilet paper produced is mainly in the paper density and the addition of different wet strength agent.

The data here represented refers to the tests of toilet paper, which are most sensitive to changes in the pulp due to the minor addition of chemical agents that interfere in the process and the lower paper density of the formed sheet.

Figure 15:
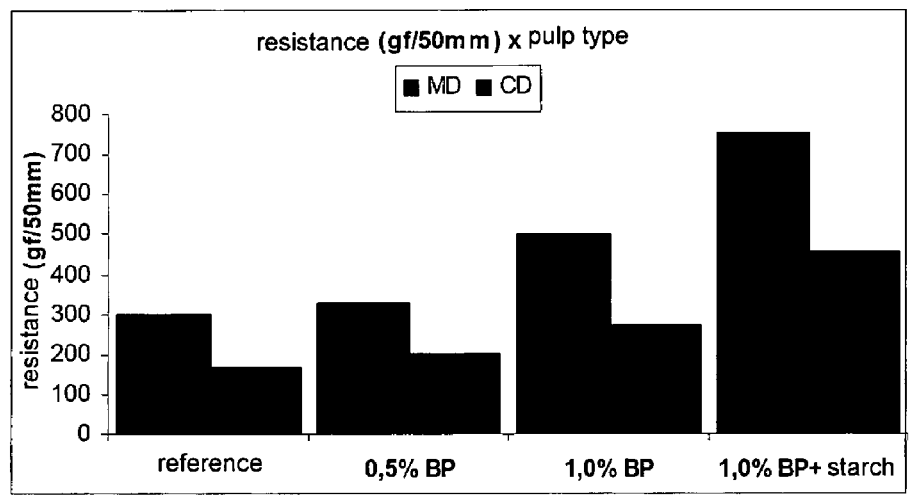
FIG. 15 shows a comparison of mechanic resistance between the tissue-type paper produced with cellulose pulp treated by the biopolymer and the tissue-type paper produced with normal cellulose pulp.

During the test, the values of paper density, bulk and mechanic strength were measured in 19 rolls removed from the machine in comparable process conditions and with a constant paper density so that the properties of the paper made from modified pulp and the paper made from reference pulp could be compared.

the machine direction, where the fiber is more lined, and has also increased by 169% in the cross direction, as shown in FIG. 15.

These tensile increases are confirmed when geometric average is performed between the tensile measured in the longitudinal and transverse directions, i.e. in this case the fibers direction are minimized. In this case, the tensile containing modified cellulose with 1.0% of biopolymer plus 6.0 kg/ton of starch.

Another important factor was the increased adherence of the sheet in the Yankee cylinder with the modified cellulose, i.e., there was a visible improvement in the crepe of the tissue paper with the increasing of the linear count of the crepe, hence the softness of paper raised and the application of adhesive on the Yankee cylinder decreased about 20%.

Figure 16:
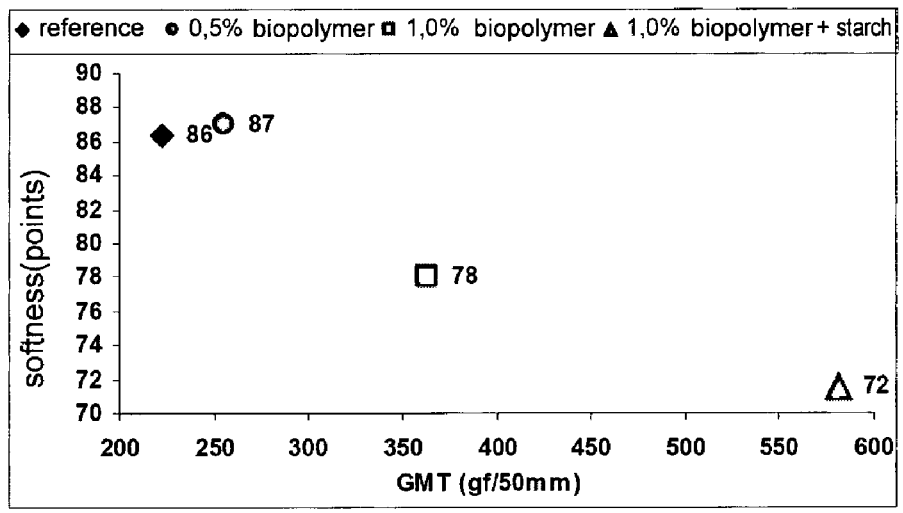
FIG. 16 shows a comparative graphic of the soft and mechanic resistance properties of the tissue-type paper produced with cellulose pulp treated by the biopolymer and the tissue-type paper produced with normal cellulose pulp.

From the analysis of FIG. 16, that shows a comparison of these two important properties, it can be concluded that a great increase of the tensile allows adjustments in the fibers formulation of the process in order to improve the quality of the final paper. Moreover, the significant increase of the mechanical strength allows a cost saving due to the replacement of long-fibers by short-fibers, or a saving of the energy used to refine the long-fiber, or a decreasing in paper density per layer of the produced paper.

Figures 17, 18:
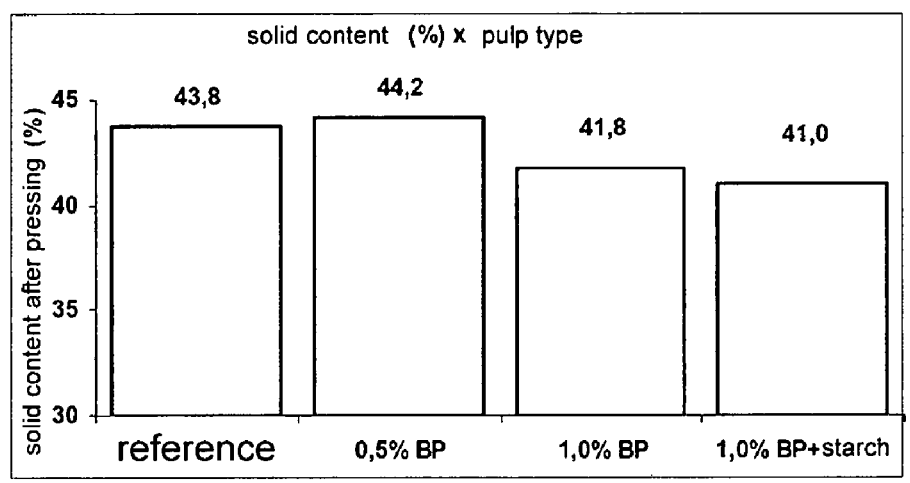
FIG. 17 shows the improvement of mechanic resistance and the lost of thickness of the tissue-type paper produced with cellulose pulp treated by the biopolymer when comparing to the tissue-type paper produced with normal cellulose pulp.
FIG. 18 shows the paper average dry content measured after the press during the production of the tissue-type paper.

Therefore, a larger amount of short-fibers results in an increasing softness of the paper, as well as a better adherence of the paper sheet to the Yankee cylinder or a decreasing in the degree of refining of long-fiber promotes a better quality of the paper, see FIG. 17.

Another improvement in the paper production with the modified cellulose was the increasing of paper dryness along the machine, in other words, the machine productivity increases and/or the specific energy consumption decreases, depending on the evolution of the profile content dry, see FIG. 18.

Description of the Production of Printing and Writing Paper

The production of printing and writing paper was performed on a Fourdrinier machine. This offset base paper with a grammage of 57 g/m² is the basis for the production of heat-sensitive paper, produced on P1 machine.

The purpose of this test is to compare the performance in paper machine and the properties obtained from standard cellulose pulp (standard pulp) and cellulose modified with 1.0% of biopolymer (modified pulp).

The production of this paper comprises the addition of mineral filler, starch in the mass and in the surface, as dry strength agent, and glue in order for repellence of water. The paper is manufactured from 100% of short fiber being refined to a certain Schopper Riegler degree that was kept for the two evaluated fibers.

The standard specifications of the machine were kept as constant as possible. The paper production machine was normal from the cellulose disintegration to obtain the final paper roll. A positive behavior noticed during the paper production with the modified pulp was the increase of the bulk so that calendering had to be maximized to keep the paper caliper specification.

Figure 19:
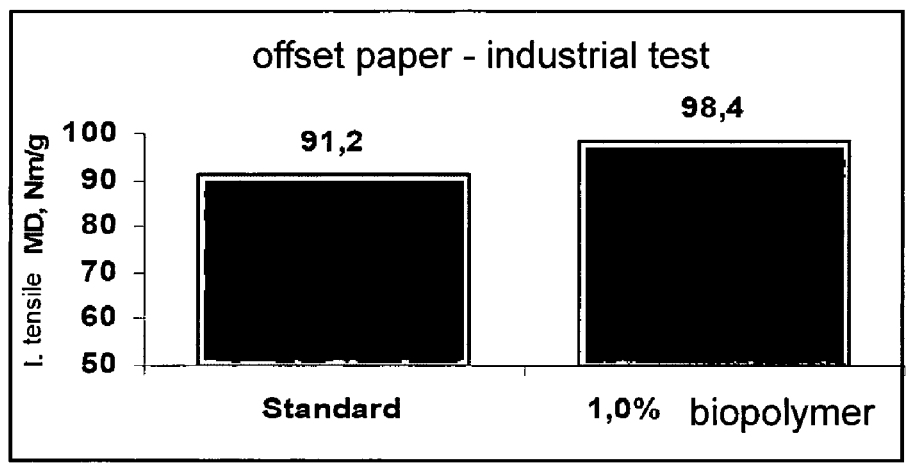
FIG. 19 shows a comparison of mechanic resistance between the woodfree uncoated paper produced with cellulose pulp treated by the biopolymer and the woodfree uncoated paper produced with normal cellulose pulp (standard).
Figure 20:
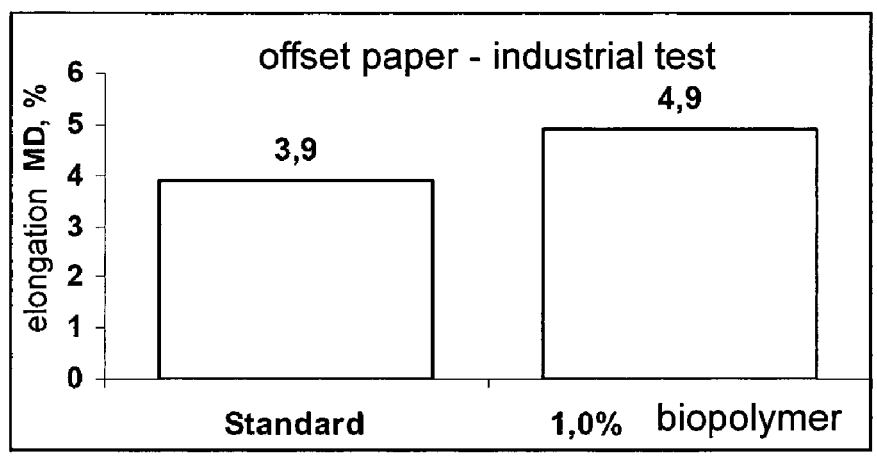
FIG. 20 shows a comparison of elongation between the woodfree uncoated paper produced with cellulose pulp treated by the biopolymer and the woodfree uncoated paper produced with normal cellulose pulp (standard).
Figure 21:
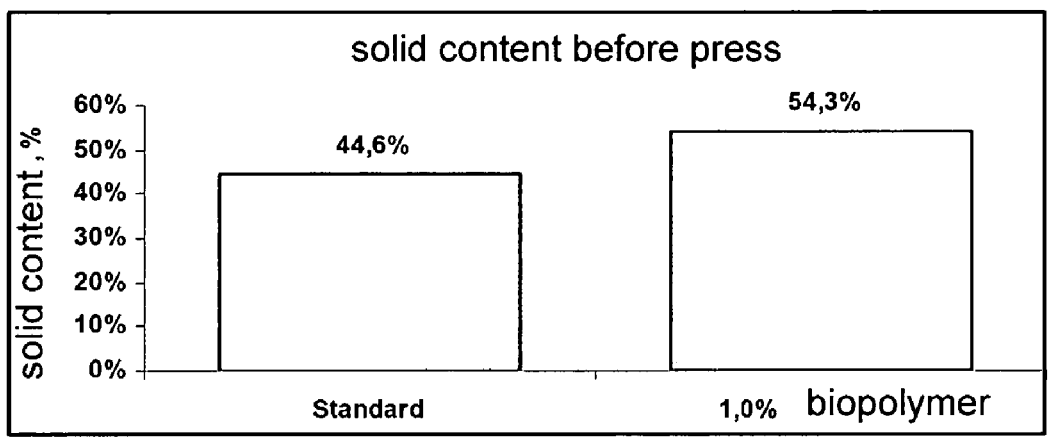
FIG. 21 shows a comparison of solid content between the woodfree uncoated paper produced with cellulose pulp treated by the biopolymer and the woodfree uncoated paper produced with normal cellulose pulp (standard).

As can be observed through results of this test, represented in FIGS. 19 to 21, the paper produced with the cellulose pulp modified by the biopolymer obtained the best results.

FIG. 19 shows an increase of 4% in tensile of the paper with modified pulp. This represents a tendency also observed in manufacturing of tissue-type paper.

FIG. 20 shows higher values of elongation for the paper produced with modified pulp. Due to the elastic nature of the connections of the biopolymer and the high number of bounds formed with the fibers, it is expected that the elongation capacity of the paper increases.

The reducing of solid content before the press is very important for the paper making process, because it represents an increasing in the production and an energy savings. The water removed from the presses and in the drying step is the most difficult to extract and therefore more expensive. The gain value of solid content is shown in FIG. 21 that has a positive result in financial production of paper machine.

The invention claimed is:

1. A paper comprising a modified cellulose pulp treated by a process comprising a step of adding during bleaching starch chemically modified by etherification, wherein the starch chemically modified is added with the pH from 3 to 11.

2. The paper of claim 1, wherein the starch is from a natural source selected from the group consisting of corn and manioc.

3. The paper of claim 1, wherein the starch is added in an amount of 5.0 kg/adt to 20.0 kg/adt based on the total amount of pulp.

4. The paper of claim 1, wherein the starch is added approximately at 45° C. to 95° C. and contact time between the starch and the pulp is in the range of from 10 to 360 minutes.

5. The paper of claim 1, wherein the starch is added in any of the bleaching steps, immediately before the bleaching sequence and/or after the bleaching sequence but prior to pulp drying.

6. The paper of claim 1, wherein the paper is tissue-type paper.

7. The paper of claim 1, wherein the paper is printing and writing paper.

* * * * *